United States Patent Office 2,999,819
Patented Sept. 12, 1961

2,999,819
PHOSPHATE GLASS COMPOSITION FOR DOSIMETER
Gerald E. Blair, Pittsford, N.Y., assignor to Bausch & Lomb Incorporated, a corporation of New York
No Drawing. Filed Nov. 23, 1959, Ser. No. 854,591
2 Claims. (Cl. 252—408)

This invention relates to an improved glass composition for use as a dosimeter for high energy radiation such as X-ray, neutron, gamma ray, and the like.

It has previously been found by Schulman et al. (U.S. Patent No. 2,524,839) that silver activated materials such as silver activated aluminum phosphate glasses provide a measure of the accumulated radiation to which they have been exposed through their fluorescence in response to ultra-violet excitation, the amount of fluorescence being proportional to the radiation. The present invention relates to an improved silver activated phosphate glass composition for dosimetric use, having improved characteristics enabling more convenient and accurate measurement of radiation exposure.

Accordingly, one important object of the present invention is to provide an improved silver activated glass composition for use as a dosimeter material.

Other objects of the invention are: to provide an improved phosphate glass composition having a more uniform response to radiation of different energy than glasses heretofore available; to provide an improved silver activated glass composition having reduced sensitivity to relatively low energy radiation such as the so-called soft X-rays, or gamma rays, relative to the sensitivity of prior glass compositions of this general nature; to provide an improved dosimeter capable of giving a relatively reliable indication of the total radiation to which it has been subjected throughout a relatively broad energy range.

Schulman et al., in their hereinabove identified patent, suggest incorporating silver ions in a matrix such as an aluminum phosphate glass or a fused salt for use as a dosimeter. Heretofore, the silver has been incorporated in an aluminum phosphate type glass comprising aluminum, barium, and potassium phosphates, which is made into a shaped body for dosimetric use. The glass so made has the disadvantage of being unduly sensitive to the so-called soft X-rays or gamma rays of about the order of 30,000 to 200,000 electron volts, as compared to its sensitivity to radiation at higher energies, that is, of about 250,000 electron volts and more. Schulman et al. (U.S. Patent No. 2,738,430) suggested shielding to overcome this problem, using shielding materials such as lead or gold of relatively high atomic number, and such shielding is effective to some degree. However, effective shielding is difficult to achieve without reducing the effective response range of the glass, i.e., cutting off too large a portion of the softer rays. It is therefore advantageous to reduce the response of the glass itself to the relatively low energy radiation so that the amount of shielding required may be reduced, relatively low atomic number materials may be used for shielding, and uniformity of response as a function of the radiation level may be achieved with a minimum reduction of the response range.

According to the present invention, it has now been found that silver activated phosphate glasses in which the matrix glass includes only relatively low atomic number metal ions, such as aluminum, lithium, and magnesium provide an improved uniformity of response to radiation over the entire energy range. Particularly, the response to relatively low energy radiation is reduced relative to previous dosimetric glasses. The sensitivity to radiation at the relatively high energy part of the spectrum is relatively uniform and about equal to the sensitivity of the prior art glasses.

The glasses of the present invention may be activated for fluorescence response with up to about 16 parts per hundred, by weight of silver metaphosphate.

The metaphosphates of aluminum, magnesium, and lithium are all glass formers, and the invention contemplates the use of any one, or a mixture of two, or all of these three metaphosphates as a matrix glass for the silver. The actual composition chosen in any given case will depend on the particular processing characteristics desired in the manufacture of the glass, the temperatures required for melting them, and other glassmaking considerations which will be within the skill of those versed in the glass making art.

The sensitivity of the glass to fast neutron radiation may be controlled by adjusting the proportion of the relatively unstable lithium isotope $3Li^6$ present in the glass. For relatively high sensitivity to so-called fast neutrons the $3Li^6$ isotope concentration should be increased. For relatively low fast neutron sensitivity the $3Li^6$ isotope concentration should be minimized. This effect is due to the relatively large capture cross-section for fast neutrons of the $3Li^6$ ion as compared with the other ions in the composition.

One glass composition which has given excellent results in preliminary tests as a radiation dosimeter was made from a batch having the following ingredients, parts by weight basis:

Aluminum metaphosphate _____ 50
Magnesium metaphosphate _____ 25
Lithium metaphosphate _____ 25
Silver metaphosphate _____ 8

This glass may be made by melting the ingredients at 1250° C., stirring the molten mass while holding it at this temperature, and then subsequently cooling it according to any desired annealing schedule for strain relief. A total melting and stirring time of approximately four hours has been found to be satisfactory.

The sensitivity of this glass to X-radiation in the 30 to 200 kev. range is about 25% to 35% less than the sensitivity of the prior art glasses, while its sensitivity to relatively hard X-radiation is about equal to the prior art glasses.

What is claimed is:
1. A dosimetric phosphate glass composition the batch constituents of which consist essentially of by weight 50 parts aluminum metaphosphate, 25 parts magnesium metaphosphate, 25 parts lithium metaphosphate, and silver metaphosphate in a proportion sufficient to render the intensity of the ultra-violet excited luminescence of said glass responsive to its previous exposure to high energy radiation.
2. A dosimetric phosphate glass composition the batch constituents of which consist essentially of by weight 50 parts aluminum metaphosphate, 25 parts magnesium metaphosphate, 25 parts lithium metaphosphate, and 8 parts silver metaphosphate.

References Cited in the file of this patent
UNITED STATES PATENTS
2,270,124   Huniger et al. _____ Jan. 13, 1942
2,524,839   Schulman et al. _____ Oct. 10, 1950